United States Patent
Rivera

(10) Patent No.: US 9,232,871 B2
(45) Date of Patent: *Jan. 12, 2016

(54) SINGLE SERVING REUSABLE BREWING MATERIAL HOLDER WITH OFFSET PASSAGE FOR OFFSET BOTTOM NEEDLE

(75) Inventor: Adrian Rivera, Whittier, CA (US)

(73) Assignee: ARM Enterprises, Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/436,690

(22) Filed: Mar. 30, 2012

(65) Prior Publication Data

US 2012/0207896 A1    Aug. 16, 2012

Related U.S. Application Data

(63) Continuation-in-part of application No. 11/777,831, filed on Jul. 13, 2007, now abandoned, and a continuation-in-part of application No. 12/610,181, filed on Oct. 30, 2009, and a continuation-in-part of application No. 12/620,584, filed on Nov. 17, 2009, now Pat. No. 8,291,812.

(51) Int. Cl.
   *A23G 1/10*    (2006.01)
   *A47J 31/00*   (2006.01)
   *A47J 31/44*   (2006.01)
   *A47J 31/06*   (2006.01)

(52) U.S. Cl.
   CPC ................................. *A47J 31/0689* (2013.01)

(58) Field of Classification Search
   CPC . A47J 31/407; A47J 31/4403; A47J 31/4407; A47J 31/3628; A47J 31/368; B65D 85/8043; B65D 85/8046; A23F 5/262; A23F 3/18; A23F 3/14; A23F 5/18; A23F 5/243
   USPC ............ 99/279, 485, 287, 289 R, 295, 302 R, 99/306, 323; 426/77–80, 112, 115, 132, 426/135, 394
   See application file for complete search history.

(56) References Cited

U.S. PATENT DOCUMENTS

| | | |
|---|---|---|
| 2,433,815 A | 12/1947 | Laforge |
| 3,022,411 A * | 2/1962 | Soper et al. ................... 219/441 |
| 3,115,822 A | 12/1963 | Totten |
| 3,120,170 A | 2/1964 | Garte |
| 3,136,241 A | 6/1964 | Price |
| 3,199,682 A | 8/1965 | Scholtz |

(Continued)

FOREIGN PATENT DOCUMENTS

WO    WO 2005/092160 A1    10/2005

*Primary Examiner* — Eric Stapleton
(74) *Attorney, Agent, or Firm* — IP Strategies

(57) ABSTRACT

A single serving beverage filter cartridge is formed by placing a single serving portion of brewing material into a reusable coffee holder having a lid and a base. The reusable coffee holder includes an offset passage in the bottom of the base and is insertable into a cartridge housing of a single serving coffee maker having an offset bottom needle reaching up vertically from the base of the housing, the offset passage providing clearance for the offset bottom needle. The coffee holder defines a frustoconical exterior and includes mesh filtering material for retaining brewing material inside the reusable coffee holder. The mesh material may be a metal mesh or plastic mesh. The reusable coffee holder is configured for use in single serving coffee makers having the offset bottom needle and designed for single use cartridges.

28 Claims, 4 Drawing Sheets

(56) References Cited

U.S. PATENT DOCUMENTS

| | | | | |
|---|---|---|---|---|
| 3,224,360 A * | | 12/1965 | Wickenberg et al. | 99/292 |
| 3,316,388 A * | | 4/1967 | Wickenberg et al. | 219/442 |
| 3,336,857 A * | | 8/1967 | Knodt et al. | 99/296 |
| 3,384,004 A | | 5/1968 | Perlman et al. | |
| 3,403,617 A * | | 10/1968 | Lampe | 99/295 |
| 3,405,630 A * | | 10/1968 | Weber, III | 99/282 |
| 3,583,308 A | | 6/1971 | Williams | |
| 3,592,126 A * | | 7/1971 | Dombrowik | 99/312 |
| 3,607,297 A | | 9/1971 | Fasano | |
| 3,695,168 A * | | 10/1972 | Van Brunt | 99/306 |
| 3,757,670 A * | | 9/1973 | Laama et al. | 99/302 R |
| 3,844,206 A * | | 10/1974 | Weber | 99/282 |
| 3,948,157 A * | | 4/1976 | Layre | 99/289 R |
| 3,958,502 A * | | 5/1976 | Vitous | 99/300 |
| 4,052,318 A * | | 10/1977 | Krebs | 210/337 |
| 4,086,848 A * | | 5/1978 | Hahn | 99/323 |
| 4,143,590 A * | | 3/1979 | Kasakoff | 99/296 |
| 4,164,644 A * | | 8/1979 | Remsnyder et al. | 219/433 |
| 4,221,670 A * | | 9/1980 | Ziemek | 210/474 |
| 4,253,385 A | | 3/1981 | Illy | |
| 4,286,515 A | | 9/1981 | Baumann et al. | |
| 4,510,853 A * | | 4/1985 | Takagi | 99/286 |
| 4,550,024 A * | | 10/1985 | le Granse | 426/77 |
| 4,603,621 A * | | 8/1986 | Roberts | 99/307 |
| 4,703,687 A * | | 11/1987 | Wei | 99/286 |
| 4,704,954 A * | | 11/1987 | Mollenhoff | 99/279 |
| 4,706,555 A * | | 11/1987 | Nakamura et al. | 99/283 |
| 4,721,835 A * | | 1/1988 | Welker | 219/689 |
| 4,739,697 A * | | 4/1988 | Roberts | 99/295 |
| 4,832,845 A * | | 5/1989 | Hendretti | 210/470 |
| 4,833,979 A * | | 5/1989 | Garulli et al. | 99/287 |
| 4,858,523 A * | | 8/1989 | Helbling | 99/280 |
| 4,865,737 A * | | 9/1989 | McMichael | 210/477 |
| 4,967,648 A * | | 11/1990 | Helbling | 99/280 |
| 4,986,172 A * | | 1/1991 | Hunnicutt, Jr. | 99/306 |
| 4,998,463 A * | | 3/1991 | Precht et al. | 99/300 |
| 5,000,082 A * | | 3/1991 | Lassota | 99/304 |
| 5,012,059 A * | | 4/1991 | Boatman | 219/689 |
| 5,028,328 A * | | 7/1991 | Long | 210/477 |
| 5,046,409 A * | | 9/1991 | Henn | 99/307 |
| 5,072,660 A * | | 12/1991 | Helbling | 99/280 |
| 5,123,335 A | | 6/1992 | Aselu | |
| 5,190,653 A * | | 3/1993 | Herrick et al. | 210/477 |
| 5,233,914 A | | 8/1993 | English | |
| 5,242,702 A * | | 9/1993 | Fond | 426/433 |
| 5,265,517 A * | | 11/1993 | Gilbert | 99/280 |
| 5,287,797 A * | | 2/1994 | Grykiewicz et al. | 99/295 |
| 5,325,765 A * | | 7/1994 | Sylvan et al. | 99/295 |
| 5,335,589 A | | 8/1994 | Yerves et al. | |
| 5,343,799 A * | | 9/1994 | Fond | 99/295 |
| 5,347,916 A * | | 9/1994 | Fond et al. | 99/295 |
| 5,363,745 A * | | 11/1994 | Lin | 99/306 |
| 5,398,596 A * | | 3/1995 | Fond | 99/295 |
| 5,401,328 A * | | 3/1995 | Schmitz | 134/58 R |
| 5,403,605 A * | | 4/1995 | Smith et al. | 426/433 |
| 5,406,882 A * | | 4/1995 | Shaanan | 99/287 |
| 5,463,932 A * | | 11/1995 | Olson | 99/280 |
| 5,490,448 A * | | 2/1996 | Weller et al. | 99/305 |
| 5,526,733 A | | 6/1996 | Klawuhn et al. | |
| 5,531,152 A * | | 7/1996 | Gardosi | 99/289 R |
| 5,562,941 A * | | 10/1996 | Levy | 426/433 |
| 5,582,730 A | | 12/1996 | Hugentobler | |
| 5,582,731 A * | | 12/1996 | Gianfranco | 210/477 |
| 5,635,233 A * | | 6/1997 | Levinson | 426/433 |
| 5,636,563 A * | | 6/1997 | Oppermann et al. | 99/285 |
| 5,669,287 A * | | 9/1997 | Jefferson et al. | 99/299 |
| 5,676,041 A | | 10/1997 | Glucksman et al. | |
| 5,775,206 A * | | 7/1998 | St-Gelais | 99/323 |
| 5,829,340 A | | 11/1998 | Yang | |
| 5,840,189 A * | | 11/1998 | Sylvan et al. | 210/474 |
| 5,865,094 A * | | 2/1999 | Kealy | 99/291 |
| 5,870,943 A | | 2/1999 | Levi et al. | |
| 5,887,510 A * | | 3/1999 | Porter | 99/287 |
| 5,897,899 A * | | 4/1999 | Fond | 426/112 |
| 5,924,563 A * | | 7/1999 | Salyers | 206/223 |
| 5,932,260 A * | | 8/1999 | Soughan | 426/78 |
| 6,065,609 A * | | 5/2000 | Lake | 210/474 |
| D431,423 S * | | 10/2000 | Ohm et al. | D7/620 |
| 6,136,352 A | | 10/2000 | Silverstein et al. | |
| 6,189,438 B1 * | | 2/2001 | Bielfeldt et al. | 99/321 |
| RE37,173 E * | | 5/2001 | Jefferson et al. | 99/299 |
| 6,227,102 B1 * | | 5/2001 | Sham et al. | 99/286 |
| 6,231,909 B1 * | | 5/2001 | Levinson | 426/433 |
| 6,250,209 B1 * | | 6/2001 | Pope | 99/323 |
| 6,253,662 B1 * | | 7/2001 | Zelson | 99/279 |
| 6,263,781 B1 * | | 7/2001 | Calagui | 99/323 |
| D454,433 S | | 3/2002 | Peter | |
| D454,434 S | | 3/2002 | McDaniel et al. | |
| 6,440,256 B1 | | 8/2002 | Gordon et al. | |
| D474,110 S | | 5/2003 | Sweeney | |
| D474,111 S | | 5/2003 | Lazaris | |
| 6,589,577 B2 | | 7/2003 | Lazaris et al. | |
| 6,606,938 B2 | | 8/2003 | Taylor | |
| 6,607,762 B2 | | 8/2003 | Lazaris et al. | |
| 6,645,537 B2 | | 11/2003 | Sweeney et al. | |
| 6,655,260 B2 * | | 12/2003 | Lazaris et al. | 99/295 |
| 6,658,989 B2 | | 12/2003 | Sweeney et al. | |
| 6,662,955 B1 * | | 12/2003 | Lassota | 210/482 |
| 6,708,600 B2 * | | 3/2004 | Winkler et al. | 99/295 |
| 6,727,484 B2 * | | 4/2004 | Policappelli | 219/689 |
| 6,740,345 B2 * | | 5/2004 | Cai | 426/77 |
| 6,758,130 B2 * | | 7/2004 | Sargent et al. | 99/295 |
| 6,786,136 B2 * | | 9/2004 | Cirigliano et al. | 99/323 |
| 6,832,542 B2 | | 12/2004 | Hu et al. | |
| 6,843,165 B2 | | 1/2005 | Stoner et al. | |
| D502,362 S | | 3/2005 | Lazaris et al. | |
| 6,904,840 B1 | | 6/2005 | Pfeifer et al. | |
| 6,948,420 B2 | | 9/2005 | Kirschner et al. | |
| 6,968,775 B2 * | | 11/2005 | Burrows et al. | 99/303 |
| 7,047,870 B2 | | 5/2006 | Gantt et al. | |
| 7,081,263 B2 | | 7/2006 | Albrecht | |
| 7,131,369 B2 | | 11/2006 | Gantt et al. | |
| 7,320,274 B2 * | | 1/2008 | Castellani | 99/295 |
| 7,730,829 B2 * | | 6/2010 | Hammad | 99/295 |
| 7,946,217 B2 * | | 5/2011 | Favre et al. | 99/295 |
| 8,047,127 B2 | | 11/2011 | Lin | |
| 8,087,347 B2 * | | 1/2012 | Halliday et al. | 99/295 |
| 2001/0043954 A1 * | | 11/2001 | Sweet | 424/725 |
| 2002/0005367 A1 * | | 1/2002 | Zelson | 206/449 |
| 2002/0023543 A1 | | 2/2002 | Schmed | 99/295 |
| 2002/0035929 A1 * | | 3/2002 | Kanba et al. | 99/279 |
| 2002/0048621 A1 * | | 4/2002 | Boyd et al. | 426/77 |
| 2002/0059870 A1 * | | 5/2002 | Walters, Jr. et al. | 99/298 |
| 2002/0078831 A1 * | | 6/2002 | Cai | 99/295 |
| 2002/0148356 A1 * | | 10/2002 | Lazaris et al. | 99/295 |
| 2003/0006185 A1 * | | 1/2003 | Hepler | 210/464 |
| 2003/0041739 A1 * | | 3/2003 | Cai | 99/287 |
| 2003/0167928 A1 * | | 9/2003 | Mulle et al. | 99/279 |
| 2003/0200872 A1 * | | 10/2003 | Lin | 99/293 |
| 2003/0213370 A1 * | | 11/2003 | Hammad et al. | 99/300 |
| 2003/0222089 A1 * | | 12/2003 | Hale | 220/912 |
| 2003/0226449 A1 * | | 12/2003 | Carasso et al. | 99/279 |
| 2004/0020368 A1 * | | 2/2004 | Cai | 99/279 |
| 2004/0020922 A1 * | | 2/2004 | Alves | 219/679 |
| 2004/0118290 A1 * | | 6/2004 | Cai | 99/275 |
| 2004/0182247 A1 * | | 9/2004 | Guerrero | 99/275 |
| 2004/0244600 A1 * | | 12/2004 | Lalanne-Eygun | 99/279 |
| 2005/0051478 A1 * | | 3/2005 | Karanikos et al. | 210/469 |
| 2005/0160918 A1 * | | 7/2005 | Winstanley et al. | 99/279 |
| 2005/0172819 A1 * | | 8/2005 | Chen et al. | 99/279 |
| 2005/0236323 A1 * | | 10/2005 | Oliver et al. | 210/464 |
| 2005/0257695 A1 * | | 11/2005 | Dobranski et al. | 99/485 |
| 2005/0266122 A1 * | | 12/2005 | Franceschi | 426/77 |
| 2005/0284303 A1 * | | 12/2005 | Zell et al. | 99/279 |
| 2006/0019000 A1 * | | 1/2006 | Zanetti | 426/112 |
| 2006/0107841 A1 * | | 5/2006 | Schifferle | 99/279 |
| 2006/0159815 A1 | | 7/2006 | Crook et al. | |
| 2006/0174769 A1 | | 8/2006 | Favre et al. | |
| 2006/0196364 A1 | | 9/2006 | Kirschner | |
| 2006/0254428 A1 * | | 11/2006 | Glucksman et al. | 99/302 P |
| 2007/0175334 A1 * | | 8/2007 | Halliday et al. | 99/279 |
| 2007/0277677 A1 * | | 12/2007 | Roberg | 99/323 |
| 2009/0229471 A1 | | 9/2009 | Lun et al. | |
| 2010/0083843 A1 * | | 4/2010 | Denisart et al. | 99/295 |

(56) References Cited

U.S. PATENT DOCUMENTS

| | | | |
|---|---|---|---|
| 2010/0288131 A1* | 11/2010 | Kilber et al. | 99/295 |
| 2010/0303964 A1* | 12/2010 | Beaulieu et al. | 426/77 |
| 2011/0209623 A1 | 9/2011 | Leung et al. | |
| 2011/0274802 A1* | 11/2011 | Rivera | 426/431 |
| 2012/0207895 A1* | 8/2012 | Rivera | 426/433 |
| 2012/0207896 A1* | 8/2012 | Rivera | 426/433 |
| 2012/0276264 A1* | 11/2012 | Rivera | 426/433 |
| 2012/0285330 A1 | 11/2012 | Demiglio et al. | |
| 2012/0285334 A1 | 11/2012 | Demiglio et al. | |
| 2013/0017303 A1* | 1/2013 | Vu | 426/433 |
| 2013/0025466 A1* | 1/2013 | Fu et al. | 99/295 |
| 2013/0156897 A1* | 6/2013 | Goldstein | 426/115 |
| 2014/0245895 A1 | 9/2014 | Demiglio et al. | |
| 2014/0287105 A1* | 9/2014 | Husband et al. | 426/115 |

* cited by examiner

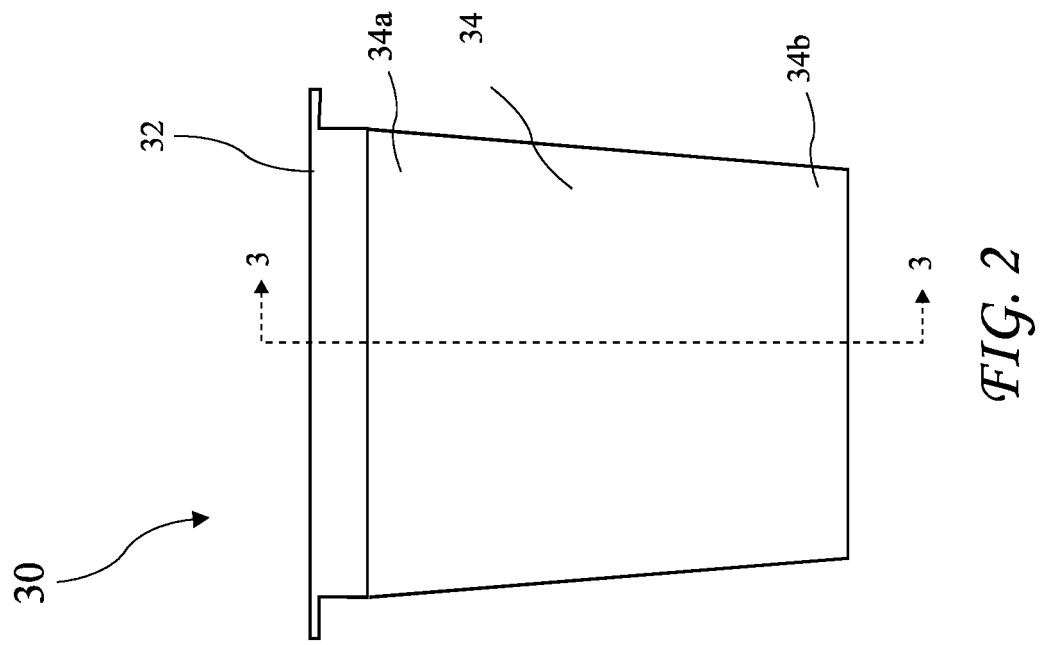
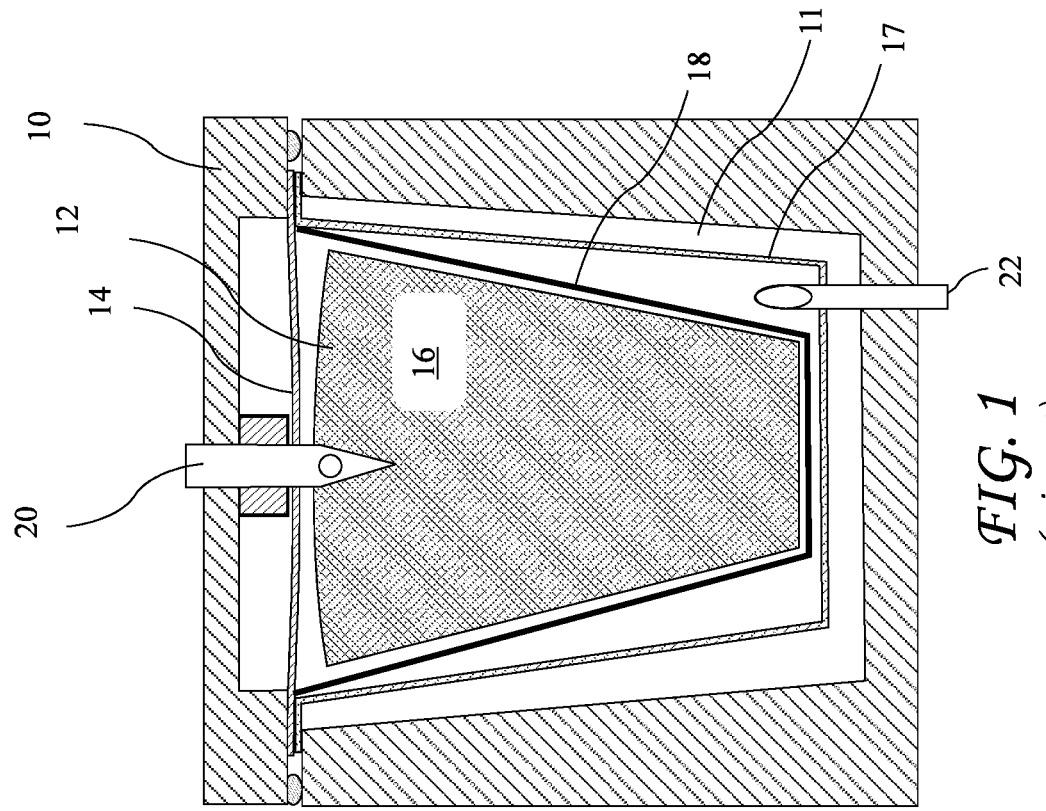

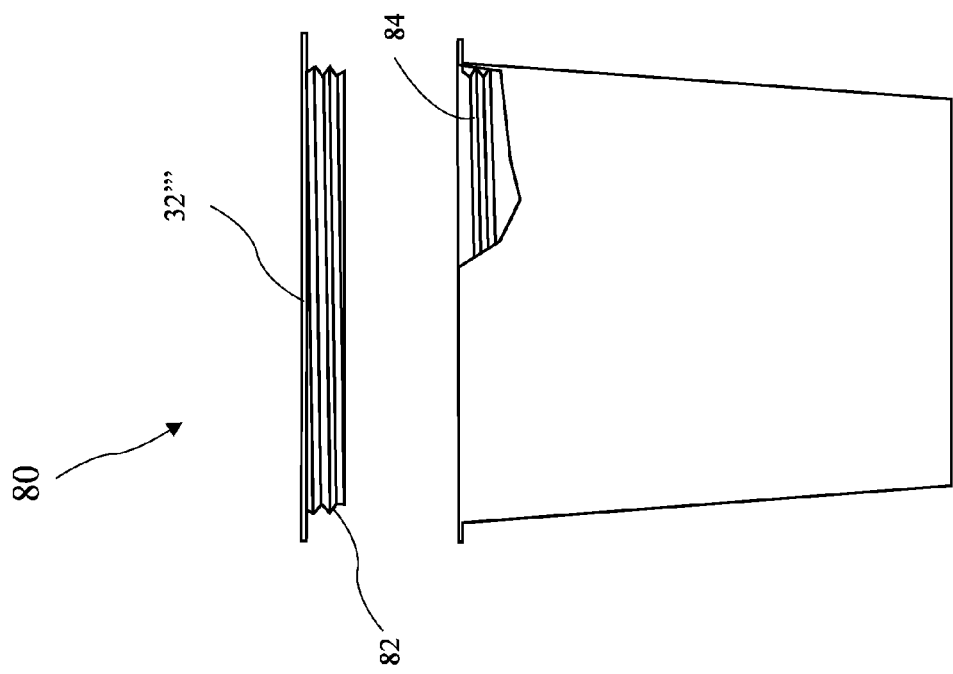
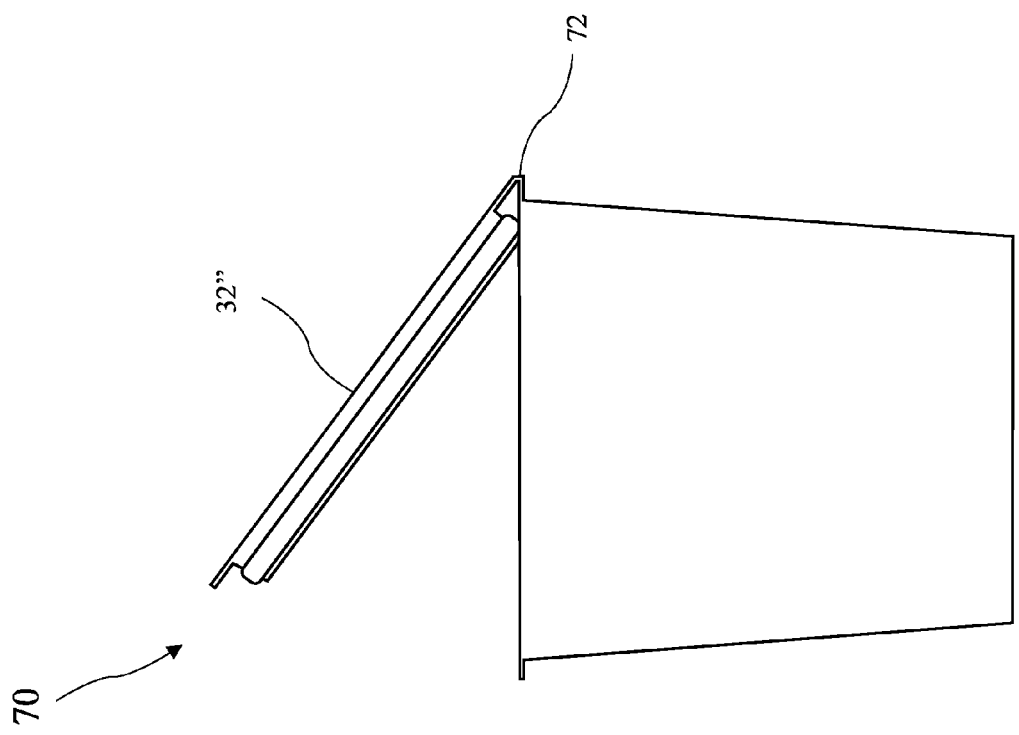

US 9,232,871 B2

SINGLE SERVING REUSABLE BREWING MATERIAL HOLDER WITH OFFSET PASSAGE FOR OFFSET BOTTOM NEEDLE

The present application is a Continuation In Part of U.S. patent application Ser. No. 11/777,831 filed Jul. 13, 2007, a Continuation In Part of U.S. patent application Ser. No. 12/610,181 filed Oct. 30, 2009, and a Continuation In Part of U.S. patent application Ser. No. 12/620,584 filed Nov. 17, 2009, which applications are incorporated in their entirety herein by reference.

BACKGROUND OF THE INVENTION

The present invention relates to single serving coffee makers and in particular to a single serving reusable brewing material holder including a reusable mesh material to retain the brewing material in the holder.

Coffee is prepared in a coffee maker by measuring an amount of ground coffee into a coffee filter, closing a lid over the ground coffee, and providing a stream of hot water through the ground coffee. In recent years, single serving coffee makers have become very popular, for example, Keurig® coffee makers. U.S. Pat. Nos. 5,325,765 and 6,708,600 disclose a housing and cooperating filter cartridge for use in a Keurig® coffee maker. While the housing and cartridge of the '765 patent are very popular, the cost of single use cartridges far exceeds the cost of the brewing material contained in the cartridges. The '765 and '600 patents are herein incorporated by reference in their entirety.

BRIEF SUMMARY OF THE INVENTION

The present invention addresses the above and other needs by providing a single serving beverage filter cartridge which is formed by placing a single serving portion of brewing material into a reusable coffee holder having a lid and a base. The reusable coffee holder includes an offset passage in the bottom of the base and is insertable into a cartridge housing of a single serving coffee maker having an offset bottom needle reaching up vertically from the base of the housing, the offset passage providing clearance for the offset bottom needle. The coffee holder defines a frustoconical exterior and includes mesh filtering material for retaining brewing material inside the reusable coffee holder. The mesh material may be a metal mesh or plastic mesh. The reusable coffee holder is configured for use in single serving coffee makers having the offset bottom needle and designed for single use cartridges.

In accordance with one aspect of the invention, there is provided a coffee holder including a metal filter mesh material interposed between an interior and exterior of the holder to retain brewing material in the holder. The filter mesh material may be a metal or plastic mesh.

In accordance with another aspect of the invention, there is provided a coffee holder having a bottom with an offset passage. The holder fits into existing single serving coffee makers having an offset bottom needle and the offset passage provides clearance for the offset bottom needle.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a prior art single serving housing and filter cartridge.

FIG. 2 is a side view of a first single serving coffee holder according to the present invention.

FIG. 5 shows a side view of a holder 70 having a hinged holder lid 32"

FIG. 6 shows a side view of a threaded holder and threaded holder lid according to the present invention.

Corresponding reference characters indicate corresponding components throughout the several views of the drawings.

DETAILED DESCRIPTION OF THE INVENTION

Figure 4:
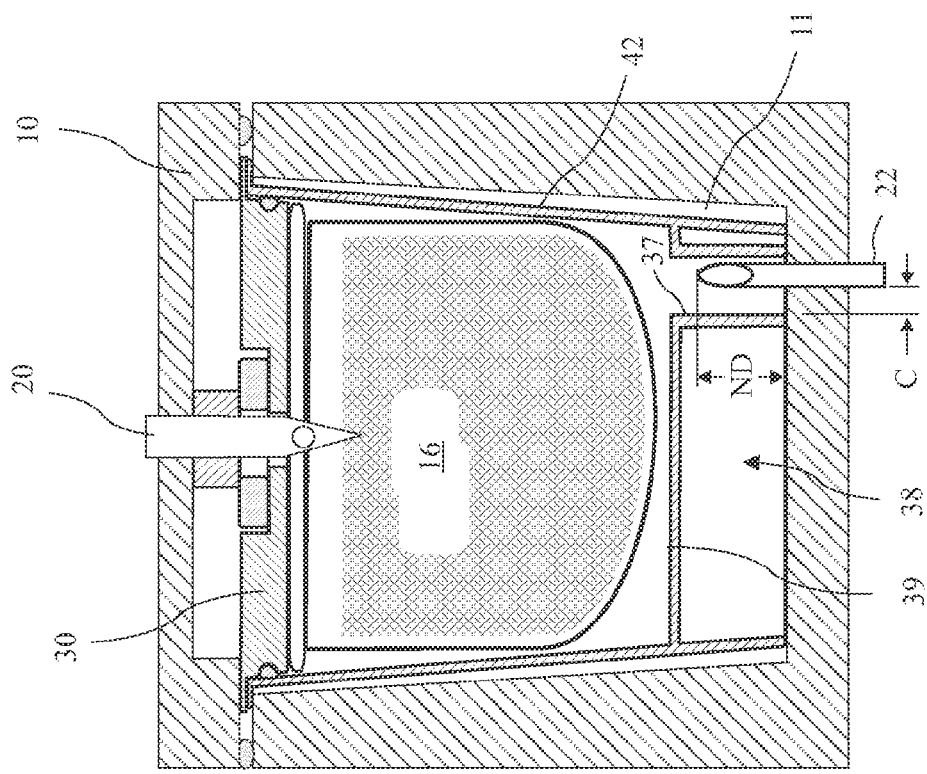
FIG. 4 is a cross-sectional side view of the single serving coffee holder according to the present invention taken along line 3-3 of FIG. 2 in the prior art single serving housing.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A prior art single serving housing 10 of a coffee maker and single use filter cartridge 12 residing in a brewing chamber 11 of the coffee maker, disclosed in U.S. Pat. Nos. 5,325,765 and 6,708,600 (incorporated by reference above) are shown in FIG. 1. The filter cartridge 12 includes a pierceable shell 14 and contains brewing material 16. An upper needle 20 penetrates the top of the shell 14 and an offset bottom needle 22 penetrates the base 17 of the shell 14 and receives the brewed drink produced in the cartridge 12 and carries the brewed drink from the brewing chamber when the housing 10 is closed on the cartridge 12. A single use disposable filter cartridge sold under the trademark K-CUP® has a top edge with a diameter of about 1.8 inches, a height of about 1 ¾ inches, and a frustoconical shape with a base smaller than the top edge. The base of the K-CUP cartridge is generally about 1.45 inches in diameter.

A side view of a first single serving coffee holder 30 according to the present invention is shown in FIG. 2. The coffee holder 30 includes a lid 32 and a base (or receptacle) 34. The base 34 includes a larger diameter top 34a and a smaller diameter bottom 34b and is generally frustoconical in shape.

Figure 3:
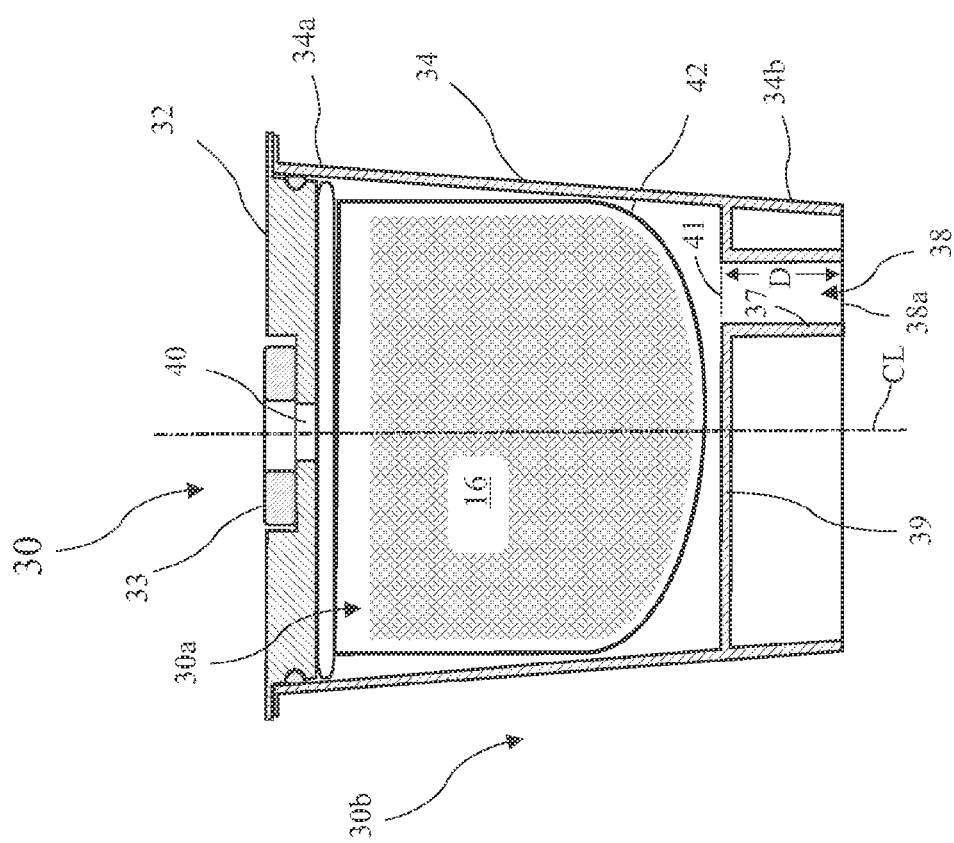
FIG. 3 is a cross-sectional side view of the single serving coffee holder according to the present invention taken along line 3-3 of FIG. 2.

A cross-sectional side view of the coffee holder 30 is shown in FIG. 3 and a second cross-sectional view of the coffee holder 30 in the prior art single serving housing 10 is shown in FIG. 4. A passage 40 in the lid 32 is provided for the needle 20. The bottom of the base 34 includes an offset bottom passage 38 reaching upward into the base 34. The coffee holder 30 defines an interior region 30a and an exterior region 30b. Lid 32 may be removably attachable to the base 34, or hingedly attached to the base 34. The removable lid 32 may be an interference fit to the base 34, or the lid 32 and base 34 may have cooperating threads to threadably attach, or the lid 32 may be otherwise attached to the base 34. An vertical interior wall portion 37 defines a portion of a wall of an offset bottom needle clearance volume nearest to a centerline CL of the coffee holder 30, corresponding to the offset bottom passage 38, in the bottom of the holder base 34, having an open bottom 38a. A horizontal border 41 is defined by a floor 39 residing between the offset bottom needle clearance volume and the interior 30a of the holder base 34. The needle 22 is seen to reach a needle distance ND into the holder base 34. The border 41 is a vertical distance D above the bottom 34b of the holder base 34 and the border 41 is shown. The distance D is preferably about ten mm. When the coffee folder 30 resides in the brewing chamber 11, the bottom needle 22 resides in the bottom needle clearance volume and is laterally spaced apart from the interior vertical wall 37 by a clearance C.

A concave down mesh filter 42 mesh filter 42 holds the brewing material 16, and retains the brewing material 16 in the interior region 30a of the coffee holder 30 separating the brewing material 16 from the exterior region 30b of the coffee holder 30. The needle 20 reaches through the passage 40 in the lid 32 to inject hot liquid into the brewing material 16 to make a brewed drink. A compliant ring 33 may be included to seal against the coffee maker. The offset bottom passage 38 provides clearance for the lower needle 22.

The housing 30 is disclosed in FIG. 5 of U.S. patent application Ser. No. 11/777,831 filed Jul. 13, 2007 by the present applicant. The present application is a Continuation In Part (CIP) of the '831 application, which '831 application was incorporated by reference above. A metal or plastic reusable coffee holder is also disclosed in the '831 application.

The mesh filter 42 is disclosed in U.S. patent application Ser. No. 12/620,584 filed Nov. 17, 2009 by the present applicant, as a nylon mesh, metal mesh, or any material capable of holding the coffee while allowing a flow of heated water through the coffee. The present application is a Continuation In Part (CIP) of the '584 application, which '584 application is incorporated by reference above. Unlike filter paper, the mesh filter may be cleaned and reused, and may be removable from the housing 30 for cleaning.

The housing 50 is disclosed in FIG. 6 of U.S. patent application Ser. No. 11/392,893 filed Mar. 28, 2006 by the present applicant for use with a coffee pod including filter paper, and the use of a mesh filter 42 is disclosed in the '584 patent incorporated by reference above. The present application is a Continuation In Part (CIP) of the '893 application is incorporated by reference above.

Figure 7:
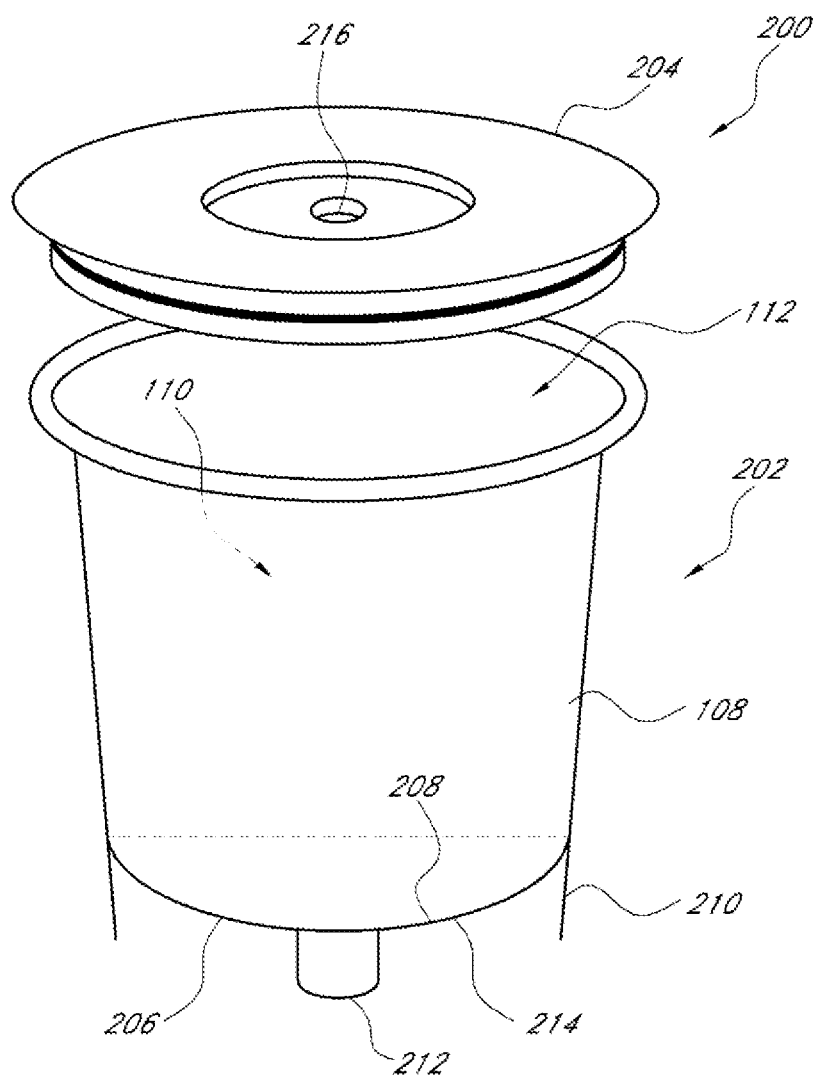
FIG. 7 is a schematic illustration of a pod adaptor assembly of another preferred embodiment of the present invention.

FIG. 7 illustrates a pod adaptor assembly 200 of another embodiment of the present invention. The pod adaptor assembly 200 generally comprises a cup-shaped holder base (or receptacle) 202 adapted to receive a pod and a cover 204 adapted to sealingly engage with the receptacle 202. The receptacle 202 has a base 206 having a downwardly sloping interior surface 208 supported by a plurality of legs 210. A passageway 212 extends downwardly from the exterior surface 214 of the base. The passageway 212 is adapted to guide and allow the needle-like structure from the brewer to extend upwardly without hitting against the receptacle or piercing the pod inside the receptacle. The passageway 212 also permits outflow of the brewed beverage from the receptacle. In one embodiment, the passageway 212 has a diameter of about 5 mm and a length of about 1 mm to 20 mm. The location of the passageway 212 relative to the base 206 is preferably selected to correspond to the location of the upwardly moving needle in the brewer. In one embodiment, the passageway 212 is offset by about 1-5 mm from the center of the base. As also shown in FIG. 2, the cover 204 of the assembly 200 has an opening 216 formed therethrough, which is adapted to allow insertion of a liquid inlet probe from the brewer.

While the invention herein disclosed has been described by means of specific embodiments and applications thereof, numerous modifications and variations could be made thereto by those skilled in the art without departing from the scope of the invention set forth in the claims.

I claim:

1. A beverage brewer, comprising:
a brewing chamber;
a container, disposed within the brewing chamber and adapted to hold brewing material while brewed by a beverage brewer, the container comprising:
a receptacle configured to receive and support the brewing material;
a mesh filter; and
a cover;
wherein the receptacle includes
a base, having an interior surface an exterior surface, and a passageway in an interior area of the base, providing fluid flow through the interior surface and the exterior surface, and
at least one sidewall extending upward from the interior surface of the base,
wherein the mesh filter is configured to be disposed within the receptacle and to receive and support the brewing material in the path of the fluid flow,
wherein the cover is adapted to sealingly engage with a top edge of the at least one sidewall, the cover including an opening, and
wherein the container is adapted to accept input fluid through the opening and to provide a corresponding outflow of fluid through the passageway;
an inlet port, adapted to provide the input fluid to the container; and
a needle-like structure, adapted to receive outflow fluid from the container through the base passageway;
wherein the passageway is disposed to receive the needle-like structure and to provide a clearance around the needle-like structure such that the needle-like structure does not puncture the base.

2. The beverage brewer of claim 1, wherein the receptacle also includes at least one extension that raises the base a predetermined distance above a lower surface of the brewing chamber, wherein the predetermined distance is selected such that a tip of the needle-like structure does not penetrate the exterior surface of the base.

3. The beverage brewer of claim 1, wherein the receptacle, the mesh filter, and the cover include materials such that the container is reusable.

4. The beverage brewer of claim 1, wherein the passageway has an unobstructed configuration.

5. The brewing material holder of claim 1, wherein the passageway is disposed at a position that is offset from a center of the base.

6. The brewing material holder of claim 1, wherein the at least one sidewall also extends downward below the exterior surface of the base a distance that is sufficiently large such that a tip of the needle-like structure does not penetrate the mesh filter.

7. The brewing material holder of claim 1, further including a passage sidewall extending downward from the passageway.

8. A beverage brewer, comprising:
a brewing chamber;
a container, disposed within the brewing chamber and adapted to hold brewing material while brewed by a beverage brewer, the container comprising:
a receptacle configured to receive the brewing material;
a mesh filter; and
a cover;
wherein the receptacle includes
a base, having an interior surface and an exterior surface, wherein at least a portion of the base is disposed a predetermined distance above a bottom surface of the brewing chamber, and at least one sidewall extending upward from the interior surface of the base, wherein the receptacle has at least one passageway that provides fluid flow from an interior of the receptacle to an exterior of the receptacle;

wherein the mesh filter is configured to be disposed within the receptacle and to receive and support the brewing material in the path of the fluid flow, wherein the cover is adapted to sealingly engage with a top edge of the at least one sidewall, the cover including an opening, and wherein the container is adapted to accept input fluid through the opening and to provide a corresponding outflow of fluid through the passageway;

an inlet port, adapted to provide the input fluid to the container; and a needle-like structure, disposed below the base;

wherein the predetermined distance is selected such that a tip of the needle-like structure does not penetrate the exterior surface of the base.

9. The beverage brewer of claim 8, wherein at least one passageway of the at least one passageway is disposed in the base.

10. The beverage brewer of claim 8, wherein the receptacle also includes at least one extension that raises the at least a portion of the base the predetermined distance above the bottom surface of the brewing chamber.

11. The beverage brewer of claim 8, wherein the receptacle, the mesh filter, and the cover include materials such that the container is reusable.

12. The beverage brewer of claim 8, wherein at least one passageway of the at least one passageway is unobstructed.

13. The brewing material holder of claim 8, wherein the passageway is disposed at a position that is offset from a center of the base.

14. A beverage brewer, comprising:
a brewing chamber;
a container, disposed within the brewing chamber and adapted to hold brewing material while brewed by a beverage brewer, the container comprising:
a receptacle configured to receive the brewing material;
a mesh filter; and
a cover;
wherein the receptacle includes
a base, having an interior surface, an exterior surface, and a passageway in an interior area of the base, providing fluid flow through the interior surface and the exterior surface, and
at least one sidewall extending upward from the interior surface of the base,
wherein the receptacle is adapted to support the brewing material a predetermined distance above a lower surface of the brewing chamber,
wherein the mesh filter is configured to be disposed within the receptacle and to receive and support the brewing material in the path of the fluid flow,
wherein the cover is adapted to sealingly engage with a top edge of the at least one sidewall, the cover including an opening, and
wherein the container is adapted to accept input fluid through the opening and to provide a corresponding outflow of fluid through the passageway;
an inlet port, adapted to provide the input fluid to the container; and a needle-like structure, disposed below the brewing material;

wherein the predetermined distance is selected such that the needle-like structure does not touch the brewing material when held by the mesh filter.

15. The beverage brewer of claim 14, wherein the receptacle also includes at least one extension that raises the base the predetermined distance above the lower surface of the brewing chamber.

16. The beverage brewer of claim 14, wherein the receptacle, the mesh filter, and the cover include materials such that the container is reusable.

17. The beverage brewer claim 14, wherein the passageway has an unobstructed configuration.

18. The brewing material holder of claim 14, wherein the passageway is disposed at a position that is offset from a center of the base.

19. A beverage brewer, comprising:
a brewing chamber;
a container, disposed within the brewing chamber and adapted to hold brewing material while brewed by a beverage brewer, the container comprising:
a receptacle configured to receive the brewing material;
a mesh filter; and
a cover;
wherein the receptacle includes
a base, having an interior surface, an exterior surface, and a passageway in an interior area of the base, providing fluid flow through the interior surface and the exterior surface, and
at least one sidewall extending upwardly from the interior surface of the base,
wherein the mesh filter is configured to be disposed within the receptacle and to receive and support the brewing material in the path of the fluid flow,
wherein the cover is adapted to sealingly engage with a top edge of the at least one sidewall, the cover including an opening, and
wherein the container is adapted to accept input fluid through the opening and to provide a corresponding outflow of fluid through the passageway;
an inlet port, adapted to provide the input fluid to the container; and
a needle-like structure, adapted to receive outflow fluid from the container through the base passageway; and
wherein the passageway allows the outflow fluid to flow from the container.

20. The beverage brewer of claim 19, wherein the receptacle also includes at least one extension that raises at least a portion of the base a predetermined distance above a lower surface of the brewing chamber, wherein the predetermined distance is selected such that a tip of the needle-like structure does not penetrate the exterior surface of the base.

21. The beverage brewer of claim 19, wherein the receptacle, the mesh filter, and the cover include materials such that the container is reusable.

22. The beverage brewer of claim 19, wherein the passageway has an unobstructed configuration.

23. The brewing material holder of claim 19, wherein the passageway is disposed at a position that is offset from a center of the base.

24. A beverage brewer including a brewing chamber configured to receive a brewing cartridge, an inlet port adapted to provide an input fluid, and a needle-like structure fixed in a bottom of the brewing chamber and adapted to puncture a shell of the brewing cartridge to carry an outflow of brewed beverage from the brewing cartridge and arranged to avoid puncturing filtering material containing brewing material disposed inside the shell, the improvement comprising:

a container configured to replace the brewing cartridge, the container positionable within the brewing chamber and adapted to hold brewing material while brewed by the beverage brewer, the container including:
- a receptacle configured to receive and support the brewing material,
- a mesh filter, and
- a cover;

wherein the receptacle includes:
- a passageway providing fluid communication between an interior of the receptacle and the brewing chamber,
- a base, having an interior surface and an exterior surface and configured to avoid contact with the needle-like structure, and
- at least one sidewall extending upwardly from the interior surface of the base and configured to avoid contact with the needle-like structure;

wherein the mesh filter is configured to be disposed within the receptacle and to receive and support the brewing material in the path of the fluid flow, wherein the cover is adapted to sealingly engage with a top edge of the at least one sidewall, the cover including an opening, and wherein the container is adapted to accept the input fluid from the inlet port through the opening and to provide a corresponding outflow of fluid through the passageway.

25. The beverage brewer of claim 24, wherein the receptacle, the mesh filter, and the cover include materials such that the container is reusable.

26. The beverage brewer of claim 24, wherein the receptacle also includes at least one extension that raises the base a predetermined distance above a lower surface of the brewing chamber.

27. The beverage brewer of claim 24, wherein the passageway has an unobstructed configuration.

28. The brewing material holder of claim 24, wherein the passageway is disposed at a position that is offset from a center of the base.

* * * * *